Figure 1:
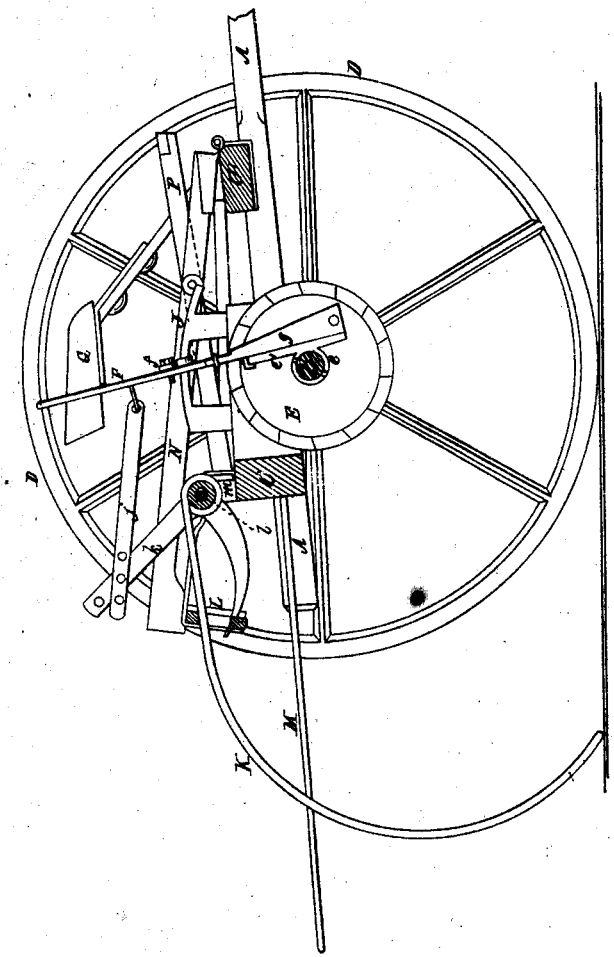

J. H. Shireman.
Horse Rake.

Nº 69713.  Patented Oct. 8, 1867.

Sheet 1.
3 Sheets.

Witnesses.

Inventor.

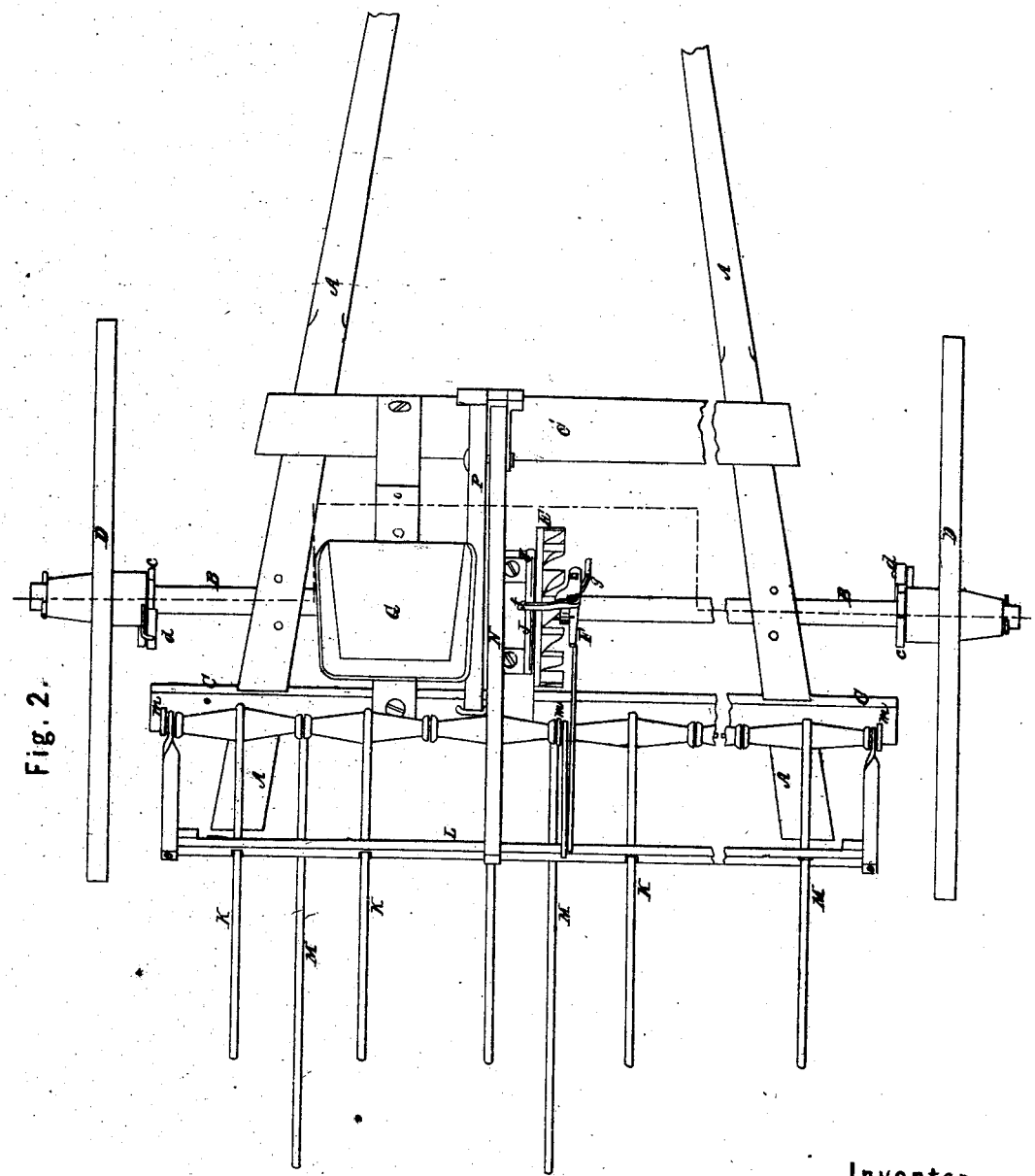

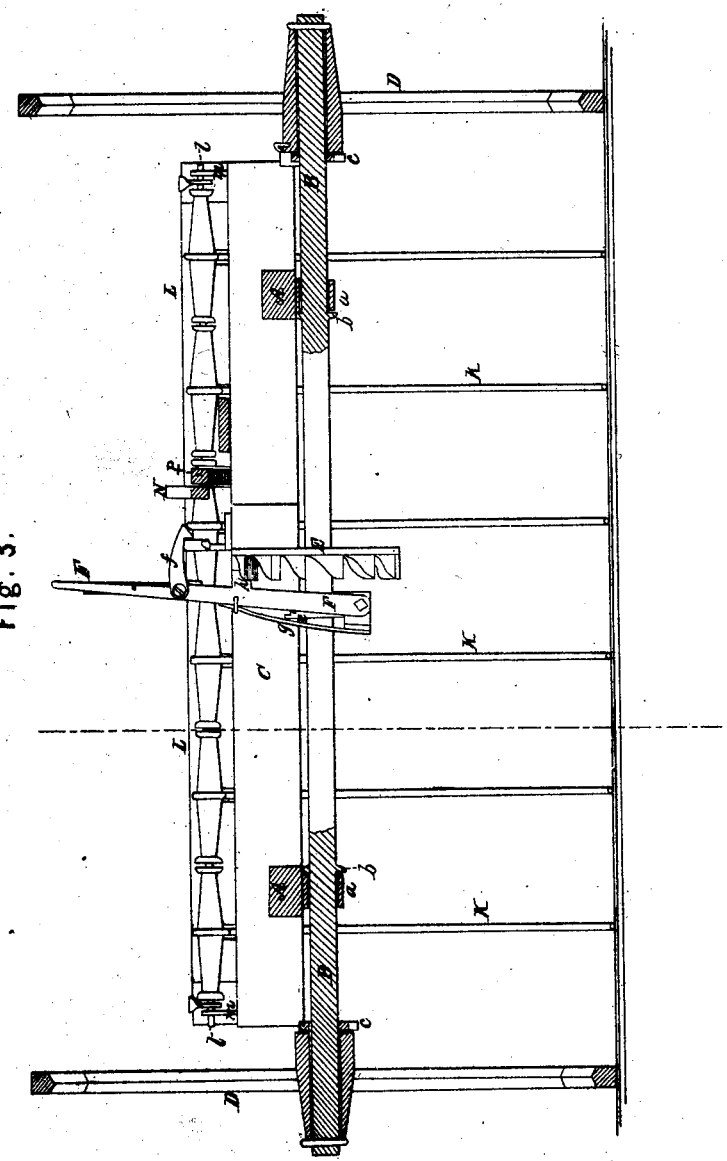

UNITED STATES PATENT OFFICE.

J. H. SHIREMAN, OF YORK, PENNSYLVANIA.

IMPROVEMENT IN HORSE-RAKES.

Specification forming part of Letters Patent No. 69,713, dated October 8, 1867.

*To all whom it may concern:*

Be it known that I, J. H. SHIREMAN, of York, in the county of York and State of Pennsylvania, have invented an Improved Horse Hay-Rake; and I do hereby declare the following to be a full, clear, and exact description thereof, reference being had to the accompanying drawings, making part of this specification, in which—

Figure 1 is a longitudinal section through the horse hay-rake, taken in the vertical plane indicated by the line $x\ x$ in Fig. 3; Fig. 2 is a plan view of the rake; Fig. 3 is a vertical transverse section through the machine, taken in the course indicated by the line $y\ y$ in Fig. 2.

Similar letters of reference indicate corresponding parts in the several figures.

This invention relates to certain novel improvements on that class of hay-rakes which are mounted upon transporting-wheels and drawn by horses. The nature of my invention consists in having the axle of the transporting-wheels attached to both of these wheels in such manner that, when the machine is drawn forward, both wheels will revolve the axle continuously in the same direction; and, when the machine is backed, both wheels may turn loosely around their axle, as will be hereinafter described.

It also consists in combining a driver's seat with a continuously-revolving axle, to which the transporting-wheels are applied by means of ratchets and pawls or other equivalent devices, and employing in conjunction therewith a pressure device by which the driver, while sitting upon his seat, can use his foot for holding the rake-teeth down firmly to their work with any required degree of pressure, as will be hereinafter explained.

To enable others skilled in the art to understand my invention, I will describe the best mode of carrying it into effect.

In the accompanying drawings, A A represent thills to which a horse is to be attached for drawing the machine, which extend back over the axle B, and have a transverse beam, C, secured to them at a suitable distance in the rear of said axle, as shown in Figs. 1 and 2. In front of this axle a transverse beam or thill-bar, C', is secured firmly to the thills, thus forming a substantial frame for supporting the raking devices and driver's seat.

The axle B passes through suitable bearings $a\ a$, applied rigidly to the bottom of the thills, so as to allow this axle to turn freely with its transporting-wheels D D when the machine is drawn forward or turned around. The collars or shoulders $b\ b$ in the axle B, inside of the bearings $a\ a$, prevent end play of this axle by abutting against these bearings, as shown in Fig. 3.

The driving and transporting wheels D D are both applied on the ends of their axle B by means of pawls and ratchets which are arranged on the inner sides of the hubs, as shown in Figs. 2 and 3, and which engage the wheels with their axle when the machine is drawn forward. The ratchet-wheels $c\ c$ are secured rigidly upon the axle B, and are engaged to their respective hubs by the pawls $d\ d$, which are pivoted to the hubs of the transporting-wheels and acted upon by springs so as to keep them always in gear with their pawls. By this arrangement the two wheels D D turn their axle continuously when the machine is moved forward, and when the machine is turned around either one wheel or the other will turn the axle; but when the machine is moved backward both wheels may turn loosely around their axle.

At or near the middle of the axle B, and rigidly secured thereto so as to turn with it, is a wheel, E, having ratchet-teeth projecting from one side of it; and alongside of the hub of this wheel is a loose collar, $e$, through which the axle B passes, and to which a standard, $e'$, is secured. To this standard a hand-lever, F, is pivoted, so as to have a lateral vibration, and to this lever a hook, $f$, and spring $g$ are applied, as shown in the drawings. When the lever F is moved toward the driver's seat G by the driver sitting thereon, a tooth, $h$, on this lever will be engaged with one of the teeth of the ratchet E, and at the same time the hook $f$ will catch over a segment-rail, J, which is secured upon an offset of the cross-bar C. The machine being moved forward during this connection, the lever F will move with the ratchet-wheel until the hook $f$ passes off at the front end of the segment-rail J, when spring $g$ will draw the lever back, and disengage its tooth $h$ from said ratchet-wheel.

The lever F is connected by a rod, $j$, to an arm, k, which is secured to the rake-bar l, to which the rake-teeth K are all separately pivoted. This rake-bar l has its bearings in standards m m m, upon the cross-beam C, and at or near its extremities short arms are secured, which project backward, and carry upon their ends a slotted transverse piece, L, which serves the threefold purpose of a pressure and lifting bar and a guide for the rake-teeth. The rake-teeth are separately secured to elongated tubular bearings m m, which are slipped upon the rod or bar l, and, being of an equal length, these bearings serve to space the rake-teeth and keep them at proper distances apart. The rake-teeth project backward through vertically oblong slots which are made through the bar L, and then curve downward and forward, as shown in Fig. 1. The longitudinal rods or teeth M, which project backward from the cross-bar C, serve as forks for cleaning the rake-teeth of hay when the raking-points of the latter are thrown up from the ground.

Alongside of the driver's seat G, and pivoted to the front bar C′, is a pressure-arm N, which extends backward and rests upon the transverse bar L, and which has a treadle, P, pivoted to it, upon which the driver puts his foot when he desires to hold down the rake-teeth to their work.

It will be seen from the above description that the driver employs the power of the horse drawing the machine for throwing up the rake-teeth and discharging the gathered load. This is effected by the action of the ratchet or toothed wheel E upon the lever F, which is connected to the vibrating rake-bar, as above described, said ratchet-wheel being secured to and rotating continuously with the axle B.

It will also be seen that the contrivance which I employ for connecting the rake-head or bar l to the wheel E on the axle operates automatically for releasing the rake and allowing it to fall back to a raking position after discharging the gathered load.

It will also be seen that the driver, while sitting upon a seat, G, over the continuously-revolving axle B, can apply and control the pressure upon the rake-teeth for holding them down to their work, and, when desired, remove this pressure altogether without engaging his hands for these purposes.

I am aware that it is not new in horse hay-rakes to employ the power of the horse drawing the machine to throw up the rake-teeth and discharge the gathered load; nor is it new to effect this by means of a contrivance which will automatically drop the rake when it is raised to the proper height to discharge the load.

I am also aware that it is not new to employ said device or devices in conjunction with an axle which has a continuously-revolving axle with one of its transporting-wheels fast thereon and the other loose thereon.

I am also aware that it is not new in harvesting machinery to employ two driving-wheels, both of which are applied to their axle by pawls and ratchets applied on the inner sides of the said wheels, for allowing of their ready removal from their shaft; and therefore, I do not lay claim to such contrivances in their broadest sense.

Having described my invention, what I claim as new, and desire to secure by Letters Patent, is—

1. In a horse hay-rake, a continuously-revolving axle or shaft, B, with ratchets and pawls, or their equivalents, applied to both wheels, substantially as and for the purposes described.

2. In a horse hay-rake, placing the ratchets and pawls upon the inner sides of both driving and transporting wheels, substantially as described.

3. In a horse hay-rake, the combination of a driver's seat, G, a pressure contrivance for holding the teeth down to their work, a continuously-revolving axle which is furnished with a lifting device, and a device connected to the rake-head which, at the will of the operator, can be thrown into gear with the lifting device of the axle for the purpose of discharging the gathered hay from the rake-teeth.

J. H. SHIREMAN.

Witnesses:
BENJ. F. THOMAS,
HENRY REISINGER.